May 25, 1926. 1,585,719

J. M. JACKSON

LUBRICATING SYSTEM FOR AUTOMOBILES AND OTHER MOTOR CARS

Filed May 4, 1925 2 Sheets-Sheet 1

WITNESSES
M. Fowler

INVENTOR
J. M. Jackson
BY
ATTORNEYS

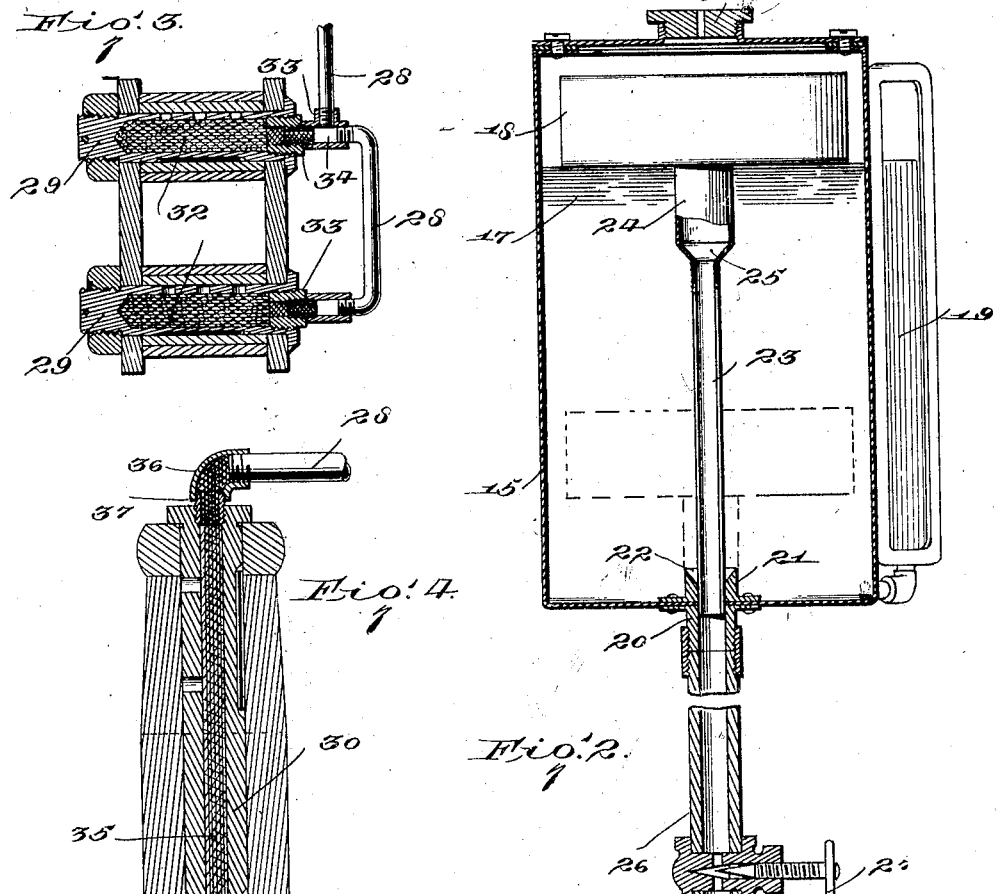
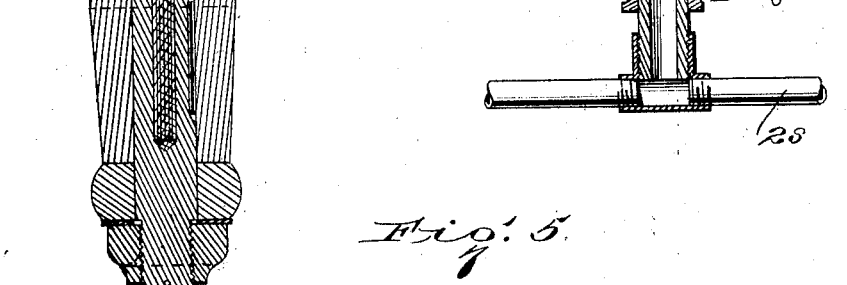
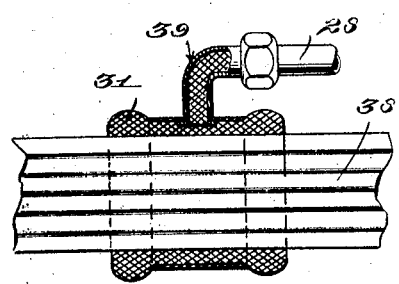

Patented May 25, 1926.

1,585,719

UNITED STATES PATENT OFFICE.

JAMES MADISON JACKSON, OF PARKERSBURG, WEST VIRGINIA.

LUBRICATING SYSTEM FOR AUTOMOBILES AND OTHER MOTOR CARS.

Application filed May 4, 1925. Serial No. 27,879.

My present invention relates generally to lubricating systems for automobiles and other motor cars having a plurality of points to be lubricated and is more particularly a central feed system embodying certain improvements over that system described and claimed in my co-pending application No. 19,933, which was filed April 1, 1925.

Among the various objects and advantages proposed at present, my invention aims to provide means for lubricating springs, spring shackle bolts, steering gears, steering knuckle bolts, clutch throw-out collars, and various other points from a central reservoir having means whereby to prevent the exhaustion of its lubricant, and in this way prevent the entrance of air into the feed pipe leading from the reservoir and the various branches of this pipe extending to the several points to be lubricated.

A still further object is to provide a system including a reservoir and a feed pipe leading from the reservoir having branch pipes extending to various points to be lubricated, and also including means at the various points to be lubricated for controlling the feed of lubricant to these points, the said feed control means being of such nature as to permit of the formation of a partial vacuum in the feed pipe and its branches in conjunction with a valve in the feed pipe whereby the latter may be cut off, and a still further object is the provision of such an arrangement wherein the said valve of the feed pipe is also adapted for use as a drip valve without destroying the function of the feed control means.

In the accompanying drawings which illustrate my present invention and form a part of this specification:

Figure 2 is a detailed vertical section through the reservoir and a feed pipe leading therefrom;

Figure 3 is a vertical section through one of the spring shackles and the shackle bolts thereof;

Figure 4 is a similar view through one of the steering knuckle bolts, and,

Figure 5 is another similar view along one of the spring oiling devices.

Figure 1:
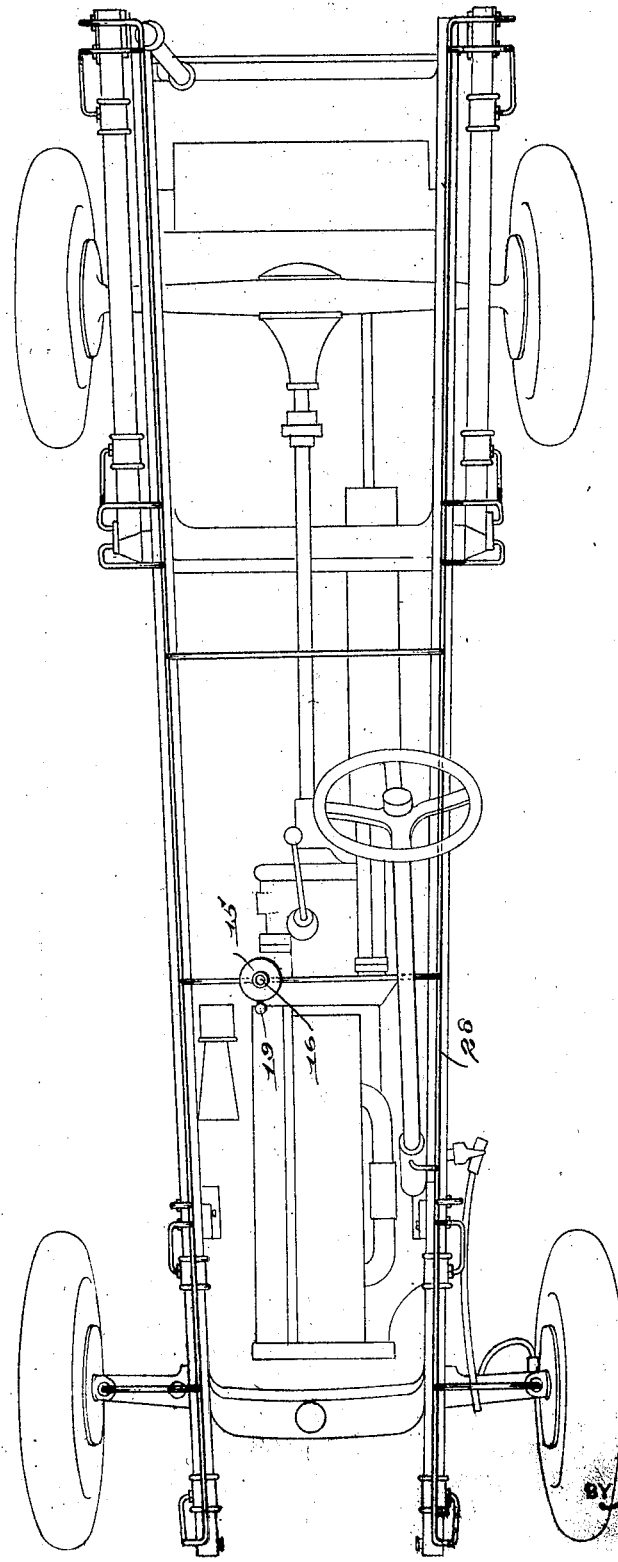
Figure 1 is a top plan view illustrating the practical application of my invention in a more or less diagrammatic manner in connection with the chassis of an automobile.

Referring now to these figures, and particularly to Fig. 1, I have shown at 15 a reservoir for fluid lubricant or oil, which may be suitably disposed at a convenient point, though preferably arranged for disposition and mounting within the hood of the automobile. When so disposed it is subject, of course, to the heating influence of the automobile motor, so that the oil will be maintained in a fluent state at all times when the machine is in operation. As shown in Fig. 2 this reservoir has a filling aperture normally closed by an apertured cap 16, which prevents the formation of a vacuum within the upper portion of the reservoir above the surface of the oil 17 as well as above a float 18. This reservoir, as further shown in Fig. 2 may have a gauge glass 19 at one side in order to indicate the height of the fluid within the reservoir, and is provided in its base with an outlet nipple 20 having an inner upstanding portion 21 provided with a valve seat 22. The float 18 has a depending axial hollow slotted stem 23 extending downwardly through the nipple 20, and is also provided with an enlargement 24 at the upper end of the stem forming between the same and the stem a valve member 25 adapted in the downward movement of the float to engage the valve seat 22 before the supply of oil is exhausted from the reservoir.

Connected to and depending from the nipple 20 is a feed pipe 26 having therein a control valve 27, preferably of the needle type, as indicated in Fig. 2, whereby it may act either as a drip valve or as a cut off. From the feed pipe 26 various branch pipes 28 extend to the several points to be lubricated, for instance, to the spring shackle bolts 29 of Fig. 3, the steering knuckle bolt 30 of Fig. 4, and the spring embracing band 31 of Fig. 5.

By reference to Figs. 3, 4 and 5 in particular it will be noted that the branch pipes 26 communicate in every instance with nipples having therein bushings, the latter of which in accordance with my invention are bored, their feed apertures being sized in accordance with the needs of the particular bearing in connection with which they are mounted.

Thus in Fig. 3, the branch pipes 28 are shown in connection with hollow spring shackle bolts 29, the hollows of which have therein absorbent material 32, branch pipes being connected to nipples 33 by virtue of bushings 34, the latter bored to the desired size and the nipples themselves packed with absorbent material to thus control the feed, the absorbent packing of the nipples being free from any wearing action of the bearing or joint itself. Likewise by reference to Fig. 4 it will be noted that the steering knuckle bolt 30 is hollow with a packing of absorbent material 35 in the hollow thereof and with its nipple 36 and bushing 37 both packed, the bushing being bored to the desired size. This same construction is followed through all of the movable metal to metal lubricated joints of the chassis and this may include all of the spring shackle bolts, steering knuckle bolts, steering gears, clutch throw-out collar, universal joints, and the like.

In connection with the oiling of the springs 38 as in Fig. 5, one of the branch pipes 28 leads to a nipple 39 suitably packed to control the feed to the absorbent band 31 clamped around the spring, and it is thus obvious that in every instance the points to be lubricated have in connection therewith means capable of assisting gravity by way of capillary attraction.

It is obvious that in the initial installation, the connection of each of the branch pipes 28 must be loosened adjoining that point of lubrication which it supplies, in order to permit the oil to run down into the pipe and it is equally obvious that should one of these connections break the danger of having to repeat this operation would be present if the reservoir were permitted to drain. In accordance with my present construction, however, the reservoir cannot become exhausted of its supply of lubricating oil as the float 18 in descending will cause the valve member 25 to seat in connection with the valve seat 22 and cut off the outflow of lubricant before the reservoir exhausts its supply.

In the use of the system having in the feed pipe 26 the valve 27 as per my present construction, it is preferable that this valve be employed as a cut-off valve and opened up from time to time to permit a supply of oil to run down from the reservoir and fill the several branch pipes. The valve is then closed and under control of the absorbent material packed in the nipples this oil feeds to the bearings, not only by virtue of gravity but also by virtue of capillary attraction brought into being by virtue of the presence of the absorbent material in the bearings as well as around the spring. This continues until the partial vacuum within the branch pipes balances the capillary attraction plus gravity, at which the feed stops until the valve 27 is again opened and a supply of oil permitted to run into the various branch pipes from the reservoir. It is obvious, however, that another method may be used and that is to so regulate the valve 27 that it will permit of just sufficient drip from the reservoir into the branch pipes to supply the demands at the various points to be lubricated. In this as well as in the first and preferred method, the main consideration is to maintain a proper supply of lubricant and at the same time avoid over supply to the points to be lubricated and the drip or leaking of oil therefrom.

I claim:—

1. A lubricating system for motor vehicles having springs, shackle bolts, steering gears and spindle bolts among other points to be lubricated, said system including a reservoir, a feed pipe leading from the reservoir and having branches extending to the several points to be lubricated, nipples connecting said branches to the points to be lubricated and having bored bushings and feed control packings of absorbent material, a feed controlling valve in the feed pipe adjacent to the reservoir, and an automatically controlled valve within the reservoir to prevent exhaustion of its supply of lubricant, for the purpose described.

2. A lubricating system for motor vehicles having springs, shackle bolts, steering gears and spindle bolts, among other points to be lubricated, said system including a reservoir, a feed pipe leading from the reservoir and having branches extending to the several points to be lubricated, connecting members between said branches and said points to be lubricated having feed control packings of absorbent material, a valve seat formed at the intake end of said feed pipe within the reservoir, and a float in the reservoir having a valve engageable with said seat and arranged to prevent exhaustion of the supply of lubricant, as described.

JAMES MADISON JACKSON.